June 8, 1937.  I. C. JENNINGS  2,083,068
APPARATUS FOR HEATING BY STEAM
Filed Jan. 5, 1934  7 Sheets-Sheet 1

Inventor
I. C. JENNINGS
BY
Southgate Fay & Hawley
Attorneys.

June 8, 1937.  I. C. JENNINGS  2,083,068
APPARATUS FOR HEATING BY STEAM
Filed Jan. 5, 1934  7 Sheets-Sheet 2
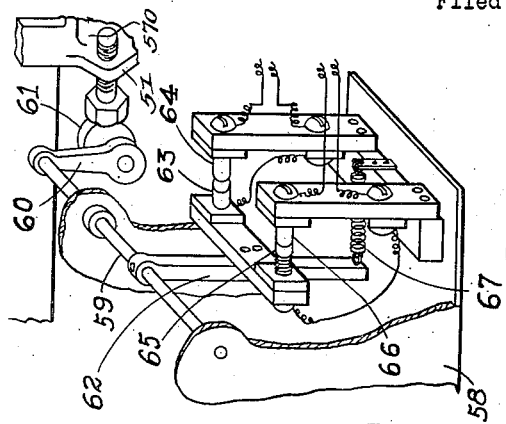
Fig. 4.
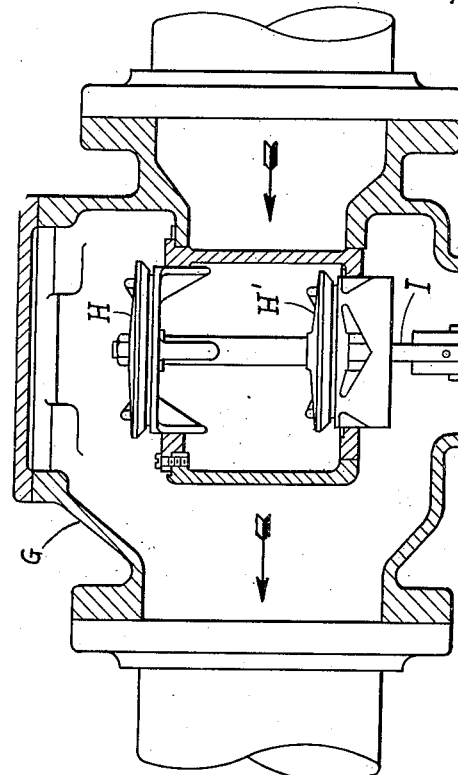
Fig. 2.
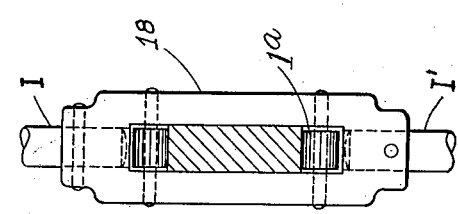
Fig. 3
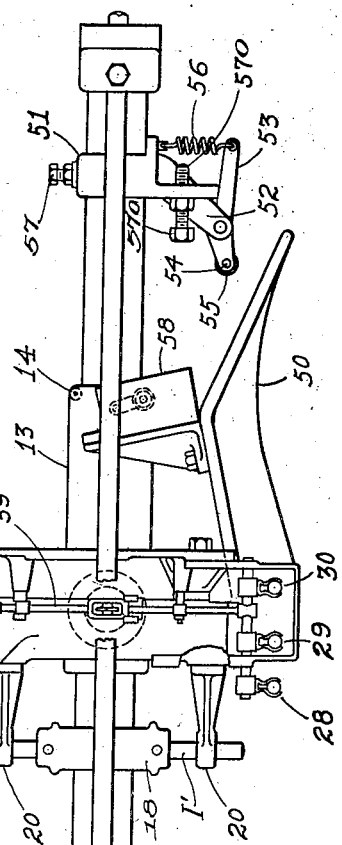
Inventor
I. C. Jennings
BY
Southgate Fay & Hawley
Attorneys.

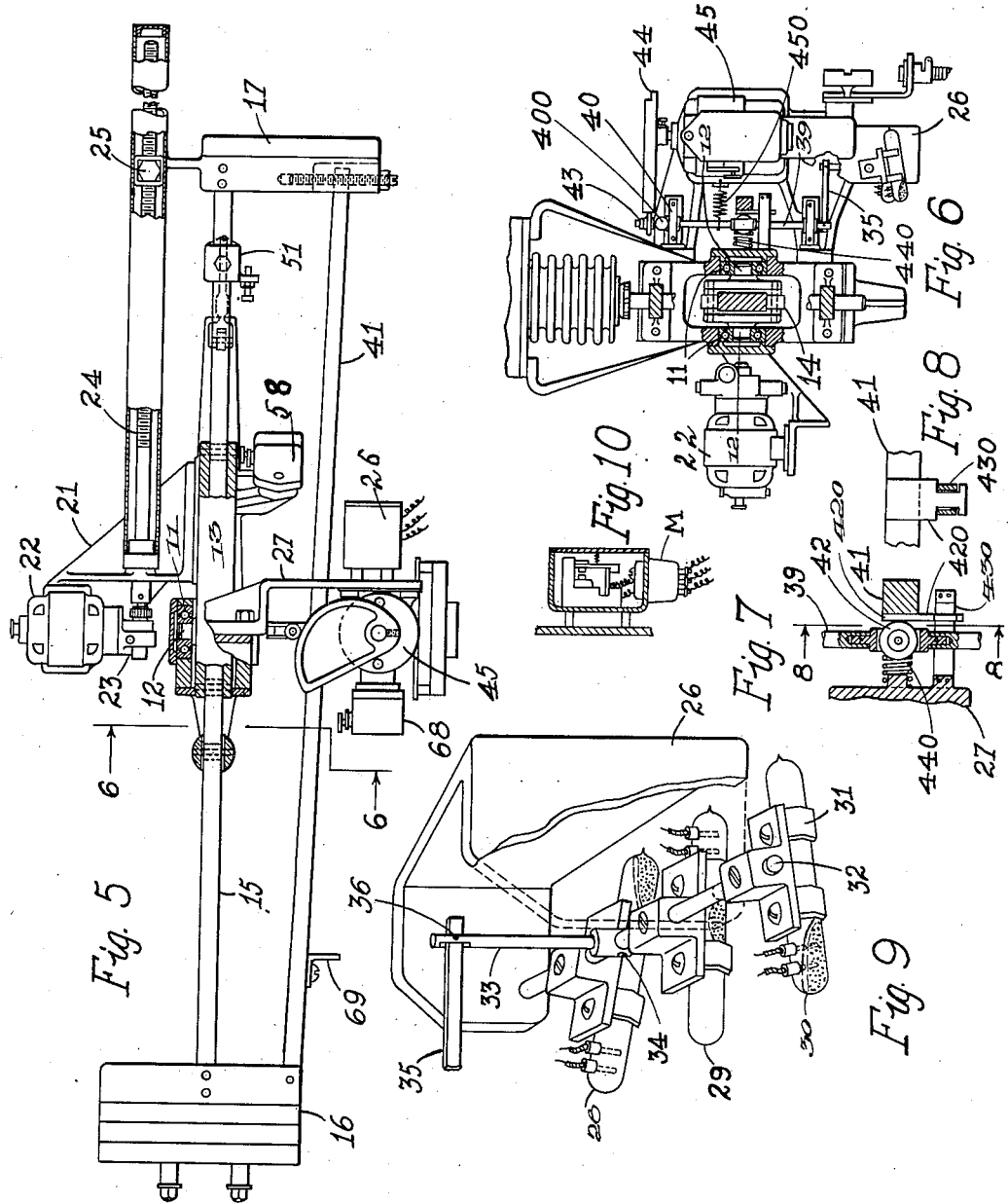

June 8, 1937.  I. C. JENNINGS  2,083,068
APPARATUS FOR HEATING BY STEAM
Filed Jan. 5, 1934  7 Sheets-Sheet 4

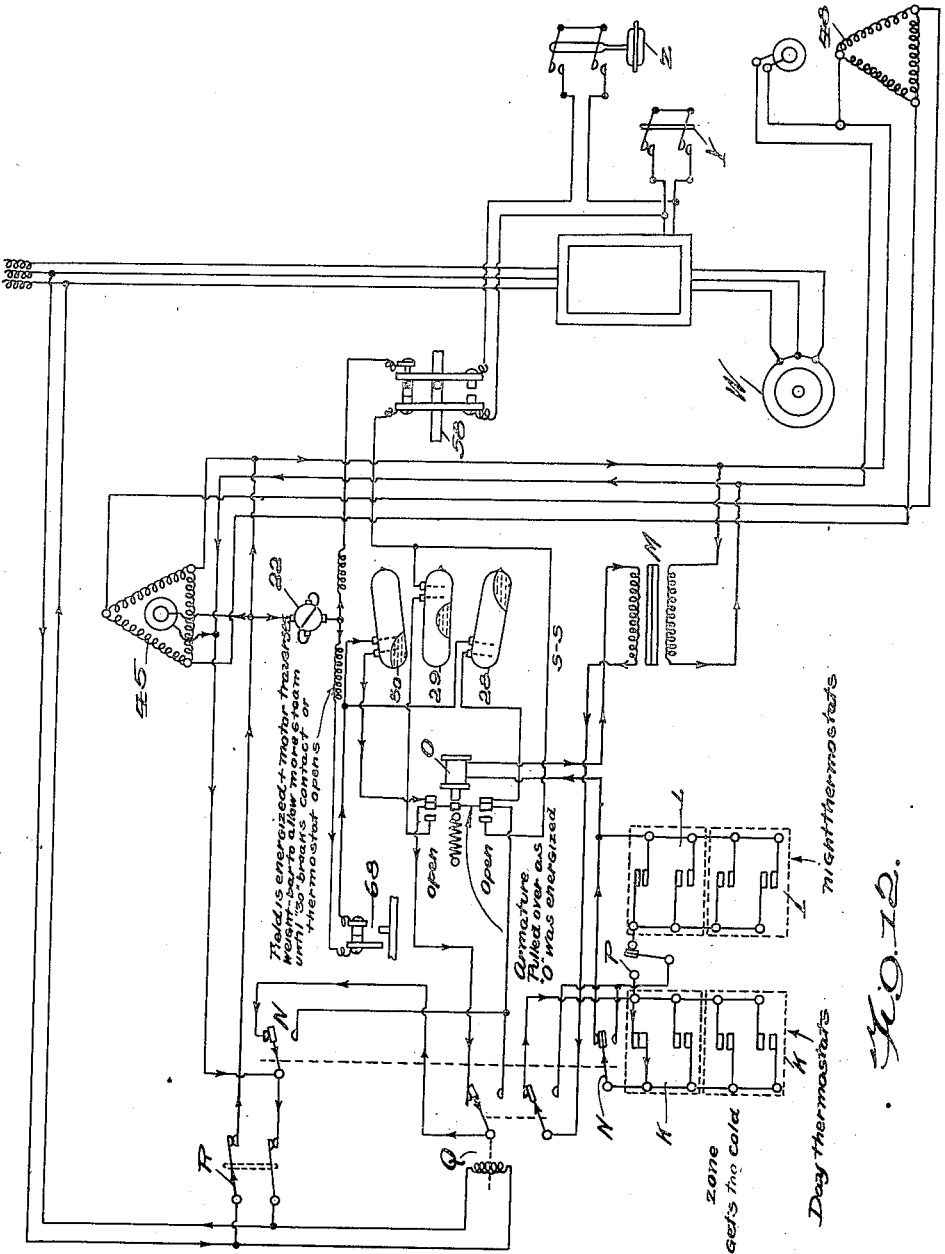

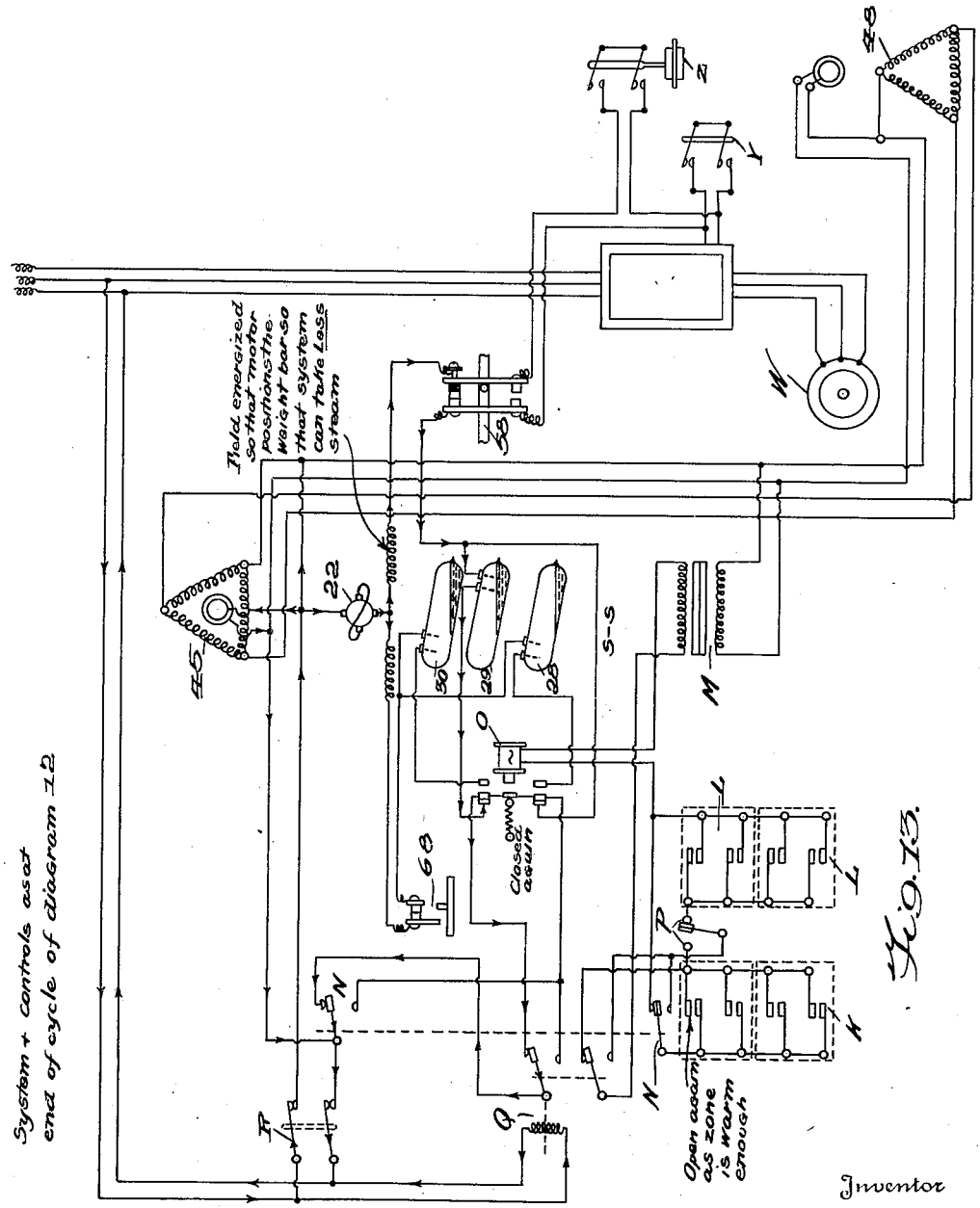

June 8, 1937. I. C. JENNINGS 2,083,068
APPARATUS FOR HEATING BY STEAM
Filed Jan. 5, 1934 7 Sheets-Sheet 7

Inventor
I. C. Jennings
By
Southgate Fay & Hawley
Attorneys

Patented June 8, 1937

2,083,068

UNITED STATES PATENT OFFICE 2,083,068

APPARATUS FOR HEATING BY STEAM

Irving C. Jennings, South Norwalk, Conn.

Application January 5, 1934, Serial No. 705,449

3 Claims. (Cl. 237—9)

The object of this invention is to provide a new and improved apparatus for heating by steam and it particularly relates to an improvement in the so-called vacuum steam heating system.

Such system comprises a source of steam supply as a steam main or boiler; a main and connections to the radiators, returns therefrom, and a pumping mechanism for maintaining a vacuum or a sub-atmospheric pressure in the returns, and if desired, in the boiler; which pumping mechanism is usually adapted to return the water of condensation to the boiler.

A pressure regulator is commonly employed in the main extending to the radiators, and this regulator is adjusted to meet the various temperature conditions encountered so as to use the steam economically.

In patent granted to me November 7, 1933, No. 1,934,504, I show, describe and claim a new and improved mechanism for automatically setting the operation of this pressure regulator.

This mechanism consists of means for automatically and variably adjusting the setting of the mechanical element of the pressure regulator to meet varying temperature conditions, and jointly co-operating outside and inside thermostatic control for the said means. Basic adjustments are made from the outside thermostatic control and supplemental superimposed adjustments are made from the inside thermostatic control. By this mechanism the flow of steam can be very accurately regulated to meet varying temperature conditions, and the steam can be used economically.

This prior mechanism contemplates a regulated flow of steam at all times through the system.

I have improved this method and apparatus by arranging the mechanism to stop the flow of steam when it is not needed, as for instance when a relatively small amount of heat is needed, as at night time, or in mild weather.

The invention has been adapted and applied to the mechanism shown in my prior patent and an additional mechanism is provided and so arranged and connected that the valve in the pressure regulator will be substantially closed when steam is not needed to maintain the temperature in the space to be heated within desired limits.

By stopping the flow of steam entirely under certain conditions the method is much improved and greater economies are effected.

The inside thermostatic control is also improved by using dual thermostatic controls so that the building may be heated within two different temperature ranges, one adapted for use in day time when the building is occupied and the other adapted for use when the building is not occupied, or in the night time.

A plurality of these dual thermostatic controls may be set on different sides of the building, if desired.

An arrangement for carrying out the improved invention is illustrated in the accompanying seven sheets of drawings, in which:—

Fig. 2 is an enlarged central sectional view through the pressure valve taken from the rear relatively to Fig. 1 to illustrate the relative arrangement of the operating parts.

Fig. 3 is an enlarged sectional view illustrating the connection of the operating parts to the valve stem of the pressure regulator.

Fig. 4 is an enlarged perspective view of the cut-out switches for the setting mechanism and for the pump.

Fig. 5 is a plan view, partly in section, illustrating the setting or adjusting mechanism.

Fig. 6 is a sectional view taken on the line 6—6 of Fig. 5, further illustrating this setting mechanism.

Fig. 7 is an enlarged sectional view illustrating an improvement in one of the operating connections of said setting or adjusting mechanism.

Fig. 8 is a partial sectional view taken on the line 8—8 of Fig. 7.

Fig. 9 is a perspective view of the Mercoid switches used in the mechanism.

Fig. 10 is a view of a step down transformer and magnetic relay employed in the electrical connection.

Fig. 11 is a diagram showing the electrical wiring.

Fig. 11a is a detail showing a modified position of the mercury switches of Fig. 11.

Fig. 11b is a detail showing a modified position of the contacts in the limit switch 58 of Fig. 11.

Figs. 12 and 13 are diagrams showing the electrical wiring with the switches in different positions.

Figure 1:
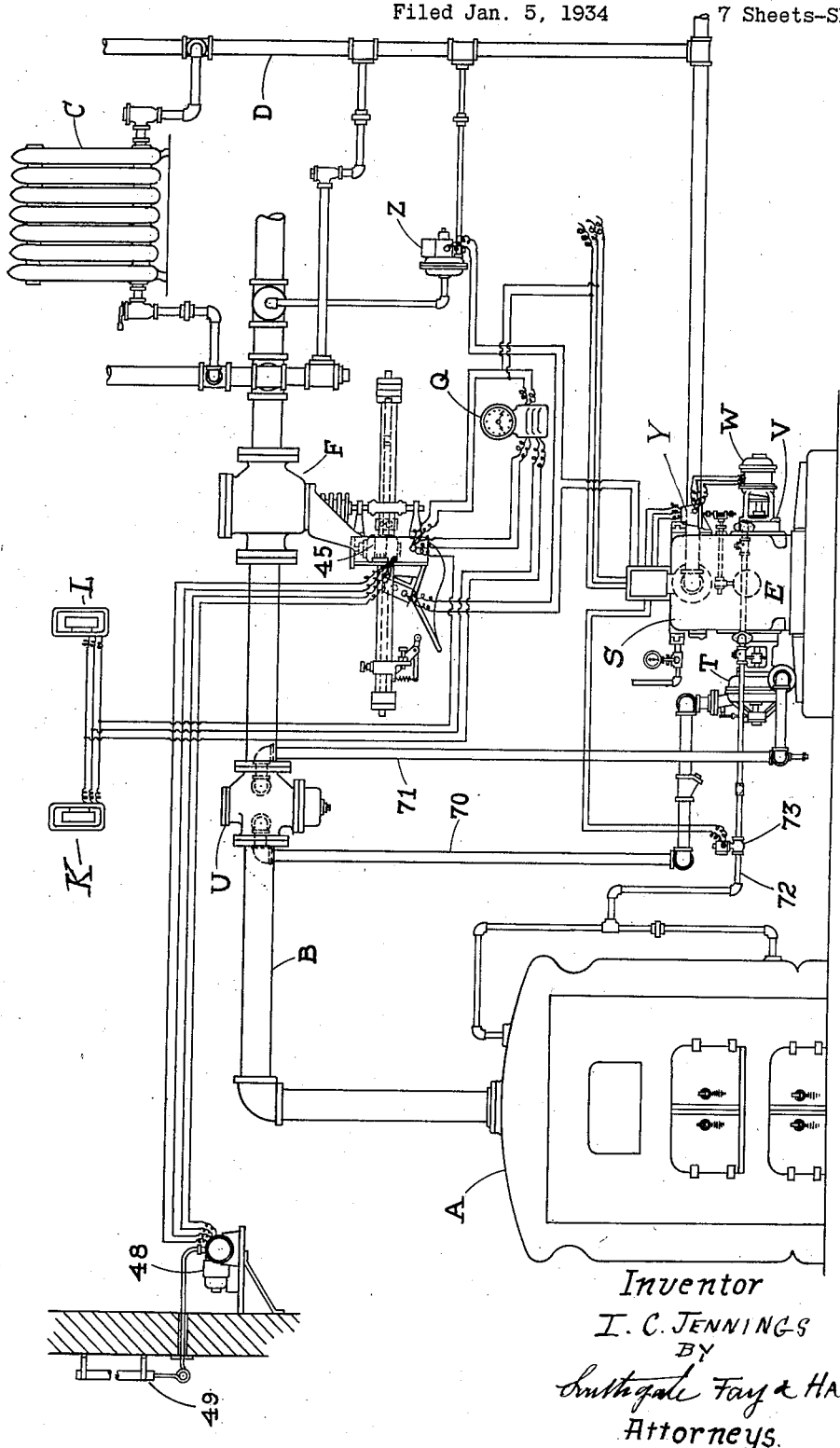
Fig. 1 is a diagrammatic elevation illustrating the general arrangement.

Referring to the drawings and in detail, A designates the boiler, B the steam supply main, C the radiators, D the return line system, and E the pumping mechanism of a vacuum steam heating system.

F designates the pressure regulator arranged to control automatically the supply of steam passing from the boiler through the supply main.

This valve comprises a casing G having two valve seats with which two valve discs H and H' fixed on stem I cooperate. The lower part I of the valve stem is connected to and surrounded by an accordion or bellows diaphragm J exposed to the pressure in the steam main supplying the radiators throughout the building.

The upper seat and valve disc H are made larger in diameter than the lower seat and valve disc H' so that if there is a higher pressure in that part of the supply main extending from the boiler to the valve than there is on the side of the valve connected to the steam main supplying the radiators, such pressure will tend to raise or open the valve but the bellows diaphragm J will tend to close the valve when the pressure in the radiator supply main has reached an amount determined by a weighted mechanical element connected as hereinafter described to control the operation of the valve.

I provide this valve with the automatic control mechanism shown in my prior patent, which is actuated by outside thermostatic control and modified by inside thermostatic control to adjust automatically this pressure in proportion to the outside temperature and to the requirements of the building.

This mechanism is constructed and arranged as follows:—

A bracket 10 is secured to the bottom of the casing G, and the same is provided with ball bearings 11—11, in which are journalled hubs or pintles 12—12 projecting from a block 13, having a rectangular recess extending longitudinally through the same. Four rollers 14 are journalled on pins in recesses near the ends of the block 13, and a weight bar 15 is arranged to slide back and forth through said block 13 on said rollers 14.

A weight 16 is secured to one end of the bar 15, and preferably a smaller weight 17 is secured to the other end of the bar, so that the center of gravity of the bar will be nearer the large weight. The parts 15, 16 and 17 make up or constitute the mechanical element or weight, although this element may be made in many forms.

The weight bar 15 extends through a yoke 18 which connects the sections I and I' of the valve stem and the yoke 18 is provided with rollers 1a bearing on the bar 15, so that the same can be shifted easily longitudinally therein, as shown in Fig. 3.

The stems I and I' are fitted to slide in bearings 20—20 secured to the bracket 10.

It is obvious from the foregoing description, that if the weight bar and weights should be shifted to the left, Fig. 2, so that the center of gravity thereof will be at the left of the pintles 12—12, that the same will then act to assist the downward movement of the diaphragm J and the closing of the valve F; while if they should be shifted to the right to bring the center of gravity to the right of the pintles that the same would then help to open the valve. It also will be noted that the amount of shift either to the right or left determines the amount of pull or push exerted by the weights.

It thus follows, that when the weights are shifted to the right, the mechanism will be set to cause the valve to maintain a greater pressure in the supply line to the radiators and so that when the weights are shifted to the left, the mechanism will be set to cause the valve to maintain a lesser pressure in said supply line, and that the pressures maintained will be proportioned to the amount of the shift.

It also will be noted that by substantial adjustment to the left, Fig. 2, the steam pressures beyond the valve may be sub-atmospheric to utilize the advantages obtained in vacuum steam heating when steam at sub-atmospheric pressure is used.

The following mechanism is provided to shift the weight. A bracket 21 is secured to block 13 and mounted on the same is an electric motor 22, which, through a worm reduction gearing 23, (Fig. 5), drives a screw 24, which is threaded into a nut 25 attached to the smaller weight 17. The motor is reversible and has two stator circuits. By proper control of its circuits, the motor will move the weights either to the right or to the left, (Fig. 5), so that the action of the pressure regulator can be adjusted to cause a maximum, minimum or any intermediate pressure in the supply line.

The switches for controlling the operation of the motor 22 are arranged in a box 26, which is secured to the bracket 10, by bracket 27.

Three Mercoid switches 28, 29 and 30 are held by clamps 31 on a shaft 32 journaled in the sides of the box 26.

An arm or lever 33 is secured on the shaft 32 by a pin 34 and the other end of the same is connected by a link 35 and pin 36 to a floating control rod 39. A slotted guide 40 is secured to the bracket 27, through which the control rod 39 projects, rollers 400 on said control rod 39 engaging said guide 40.

A follow-up bar 41 is arranged between weights 16 and 17 and the rod 39 is provided with a roller or bearing 42 engaging the same. The bar 41 is set at an angle horizontally relatively to the weight bar 15, as shown in Fig. 5, so that the travel of the weight bar will cause the follow-up bar 41 to move the control rod 39 to or fro on the pin 36 as a pivot. The right hand end of the follow-up bar is adjustably secured to the smaller weight 17, as shown in Fig. 5, so that the angle at which the bar 41 is set can be adjusted.

The parts thus far described constitute a substantial embodiment of the mechanism of my prior patent and a further detailed operation thereof is not necessary.

The engagement of the follow-up bar 41 with the roller 42, shown in my patent, has been improved, as shown in Figures 7 and 8.

A plate 420 is arranged between bar 41 and roller 42 and is tenoned into a yoke 430 secured to bracket 27, the plate thus being free to move horizontally. Any wear which may occur due to the rubbing of the bar 41 takes place on the flat surface of plate 420, the roller 42 rolling freely on the other side of plate 420. This does away with making any "flat" of the roller 42, and maintains the original freedom of the arm 39, which should operate with a minimum of friction because of the relatively low power of the Selsyn motor 45, hereinafter mentioned.

The roller 43 is free to slide up and down on the arm 39 within limits, so that as the arm 39 rocks back and forth, the roller will not have to rub on the cam 44, but the arm 39 will slide through it.

The additional rollers 400 support the weight of the arm 39 and roll on track 40. A spring 440 keeps the arm 39 and roller 42 positively against the plate 420. This spring, being applied to the center, offers very little resistance to the movement of the arm 39, and permits use of a light spring to cause the arm 39 to follow the cam 44. An additional light pull spring 450 may be used between control rod 39 and bracket 10 to help this operation.

The rod 39 is provided with another hub or roller 43 which bears against a cam 44 secured on the shaft of a receiving Selsyn motor 45. This motor 45 is connected by suitable wiring to a transmitting Selsyn motor 48, the rotor of which is turned or set by a thermostatic mechanism 49 arranged outside the building. This motor couple 45—48 is described in full length in my prior patent and acts to set the cam 44 to adjust the top end of the control rod 39 to make basic adjustments to correspond to changes in outside temperature.

The following mechanism, see Fig. 2, is added to my prior construction.

A cam plate 50 is secured to the bracket 10. A block 51 is adjustably secured to the weight bar 15. This block has ears or arms 52 between which is arranged a lever 53 pivoted on a stud 54. The lever 53 carries a roller 55 at its end in position to engage the cam plate 50. A spring 56 is arranged between the end of the lever 53 and block 51 to provide a yielding contact of the roller 55 with the cam plate 50. A lock screw 570 is threaded and checked in the block 51 providing an adjustment for the position of the block 51 on the weight bar 15. A housing 58 is carried by the cam plate 50. A shaft 59 is journaled in said housing 58 and carries an arm 60 having a roller 61 set in position to be engaged by screw 570. An arm 62 is secured on the shaft 59 and has a contact 63 set in position to engage a contact 64 arranged in said housing. The arm 62 also carries another contact 65 engaging a contact 66 carried by the housing.

The contacts 63 and 64 connect by wiring to the pump controlling element, hereinafter described, and the contacts 65 and 66 connect by wiring to control the circuit of the motor 22 which moves the weights to the left, Fig. 2. A spring 67 is provided normally to keep the contacts together.

The contact 65 is made in the form of a plunger and the same is held outwardly by a spring.

The purpose of this construction is to arrange the parts so that the pump will first be cut out of operation and then the valve adjusting mechanism will be cut out of operation momentarily thereafter. A cut out switch 68 and stop 69 are arranged to prevent the motor 22 from moving the weights too far to the right Fig. 5.

As previously pointed out, the weight bar and weights move to the left, as shown in Fig. 2 when the mechanism is to be set so that the pressure regulator is to be adjusted to supply less steam. The additional parts 50 to 56 provide mechanism which will operate to shut off the steam entirely by positively closing the pressure regulator valve F, when conditions do not require any further steam or heat and the weight bar and weights move over to their extreme left hand position. When the weight bar and weights move toward the left, as shown in Fig. 2, the roller 55 will engage the cam 50, which will cause the right hand end of the weight bar to lift, turning the weight bar around on the pintles 12 and pulling down on the valve stem I and drawing the valves H and H' tightly down on the valve seats in the pressure regulator and thus shutting off the steam entirely.

This gives an increased efficiency in operation. On day operation during cold weather, the pressure is maintained at a lower amount than is required to heat the building, and as the rooms cool off the heat is advanced by one or more of the inside thermostats to set it up to the required amount. But in milder weather when the pressure in the supply will be so low that the vacuum pump cannot produce a sufficient differential to circulate the steam throughout the system, the cam 50 comes into operation, and the pressure regulator F is shut tightly and the pump is cut out of operation. The system then operates on low pressure steam for advance heat and on no steam at all for the cooler position.

At night the system operates from shut off position to an advance heat position controlled by a night thermostat having a lower setting than the day thermostat.

Double thermostats K and L, each with day and night settings, are arranged at suitable points through the building. As many of these thermostatic sets may be used as desired as, for instance, one set may be arranged at each of the four sides of the building. These thermostatic sets are connected by suitable wiring to the Mercoid switches 28, 29 and 30, which throw the adjusting motor 22 into and out of operation. The current used in these connectors is preferably a current of low voltage produced through a transformer M. When the day thermostats are cut into operation, the motor 22 will be controlled through the Mercoids 29 and 30, and the temperature in the building will be kept within the warmer range, say from 70° to 72° F. When the night thermostats are thrown into operation, the adjustments will be made through the Mercoid 28 and direct line SS, and the temperature in the building will be kept in its lower range, say from 55° to 60° F. Each of the sets of day thermostatic couples, or night thermostatic couples may be thrown into operation by a switch N. The shifting from one motor stator circuit to another is controlled by a magnetic double poled pole switch O which is shown in cold position in Fig. 11. A switch P also may be provided to throw the day thermostatic couples in operation, for Sundays and holidays, on occasions when the building is occupied at such times, as otherwise night heat would be maintained both day and night.

In Fig. 11 the switches and parts are shown in position when the steam demand is satisfied. It will be noted that in this position, the manually operated line switch R has been closed, and this switch is kept closed as long as the heating system is to work.

The manually operated switch N has but two positions, one the normal position shown, and the other the week-end or holiday position, which transfers the circuit to the set of thermostats L, which maintain a heat level suitable for night and week-end or holiday operation.

With reference to the operation of the two sets of thermostats K and L, K being the day and L the night thermostat, it will be clear that there could be in a building having one heating zone just one day thermostat K and one night thermostat L, while in a building having a multiplicity of heating zones, there would be as many day and night thermostats as there are zones.

The series-parallel arrangement of these multiple thermostats is such that the circuit will not be completed to permit a lessened steam supply unless the thermostats in all of the zones indicate a higher than necessary heat level. Conversely, any zone thermostat may close and so permit energization of the motor field without reference to the position of any of the other zone thermostats.

A detailed examination of this diagram, Fig. 11, will show that no matter which line is followed, to supply power to energize either one of the split fields of the operating motor 22, there will be at some place in the line an open circuit or switch which will prevent any current flow in these windings and thus will maintain the adjustments herein shown until there is a change in the inside temperature affecting a thermostat or thermostats.

When the time switch Q is in the day or high level position, the manual selector switches NN' and PP' are in normal position; both high and low level thermostats are open circuited; relay O is in a de-energized position; limit switch 58 is open circuited, indicating "shut off" position of the pressure regulator F of Fig. 1. The limit switch 68 is closed, the mercury switch 29 is open, and the mercury switch 30 is closed. The mercury switch 28 is open but is in the night or low level control circuit and does not affect the instant condition.

This condition represents an outside temperature of 70° or higher and an inside temperature equal to or above high level requirements. No current flows in the control circuits.

Assume that there is a drop in temperature, which causes thermostat KL to close the high level contacts. Current flows from the transformer secondary along line 510 through the time switch, along 511, through the high level contacts of thermostat KL, along 514, through switch N' of NN' along line 512 through the electromagnet of relay O along 513 to the other side of the transformer secondary, energizing the electromagnet of relay O and drawing the armature against the magnetized core, thus closing contacts 640—641 and interrupting contacts 640—642. Current now flows from the power supply 601, along lines 610—611 through the line switch R, along 612 and 615 through the motor 22, through the field OP, along 628 through the contacts 647—648 of the limit switch 68, along 629, through the closed mercury switch 30, along 630, through the contacts 640—641 of relay O, along 621, along the time switch Q, along 622, through the switch N of NN' along 623, through the other side of the line switch R along 624—625 to the other side of the power supply 600 thus energizing the motor 22 and causing the pressure regulator F, Fig. 1, to open by means of the mechanism shown in Fig. 5.

As the regulator F opens, increasing the steam pressure to the system, the follow-up bar 41 of Fig. 5, causes the mercury switch mounting shaft to rotate through rod 39 and associated mechanism shown in Fig. 6, so that when the pressure has increased to a point considered sufficient to economically raise the temperature to the desired level within a reasonable length of time, the follow-up bar 41 will cause the mercury switch 30 to open the circuit and close the mercury switch 29, as shown in Fig. 11a. This stops the motor 22, positioning pressure regulator F, Fig. 1 and re-positioning the mercury switches.

As the regulator F of Fig. 1 moves from "shut off" to pressure condition, the limit switch 58 closes as shown in Fig. 11b, establishing the vacuum pump control circuit through the contacts 643 and 644, along 606 through the variable differential controller Z, along 605 and 604, to the electromagnet in the motor starter 500, thence from the outside of the line in the starter 500 along 603 and 607 to the contacts of the limit switch 58. The variable differential controller Z operates by pressure and vacuum, and controls the operation of the vacuum pump W maintaining a steam differential between the supply piping and the return piping, increasing with pressure and decreasing with vacuum, as described and claimed in Patent No. 1,851,434.

The power supply is from the input lines 600, 601, 602 and pumping operations are automatically controlled by the thermostat and vacuum pressure requirements.

When a sufficient amount of condensate from the return line D, Fig. 1 has collected in the receiver tank S, a ball float in the receiver tank actuates the switch mechanism of float switch Y, energizing the electromagnet of the motor starter 500 through lines 603, 604, thus operating the motor starting switch mechanism and starting the electric motor W, driving the pump and returning the condensate to the boiler A. When the condensate lowers sufficiently in the receiver, the ball float causes the float switch to open the circuit, stopping the motor.

The variable differential controller Z is so wired and piped as to throw the pumping motor W via the magnetic motor starter 500 into and out of operation to maintain a pressure differential.

The Selsyn transmitter 48, the Selsyn receiver 45, the time switch motor Q and the transformer M primary are assisted and energized by a single phase circuit taken from the power supply 600—601 directly to the time switch Q along 610 and 625 and to the primary of transformer M and the rotors of the receiver 45 and transmitter 48 by the parallel lines from the power supply 600—601 along 610—625, along 611—624, through line switch R, along 612—623, along 612—626, and tap off to receiver 45 by 613—627, along 614—626. Line 614, taps into 702 along 702—626 and tap off 631—632 to transformer M, and 626—702 to transmitter 48. The primary windings of the Selsyn receiver 45 and transmitter 48 are connected in phase by lines 700, 701, 702. While 702 is used as one side of the single phase power supply, this is done for wire economy and no power is supplied to the Selsyn primary from this source.

Assuming conditions as shown, but with a rising outside temperature:—The increased outside temperature will expand the liquid in the chamber and piping of the thermostatic mechanism 49, outside of the building. This will cause a change in the radial position of the rotor of the Selsyn transmitter 48, and as the receiver 45 is synchronized with the transmitter the cam 44, Fig. 6, will be rotated and through rod 39 and associated mechanism will change the position of the mercury switches, causing switch 30 to open and switch 29 to close. Because of the rise in temperature the inside thermostats will be open circuited and the relay O will be de-energized.

Current now flows from the power supply 601, along lead 610—611 through line switch R along 612—615, through the motor 22 and field CL, along 616, through limit switch 58, contacts 645—646, along 617 and 619, through mercury switch 29 along 620 through relay contacts 640—642, along 621 through the high level contacts of the time switch Q, along 622, through the normal contacts of switch N of NN', along 623 through the other side of the line switch R, along 624—625 to the other side of the power supply 600, thus energizing the motor 22 through the field CL and causing the regulator F to close and reduce the system pressure. As the regulator F moves toward closed position, the follow-up bar 41 of Fig. 5 rotates the mercury switch mounting, thus opening the switch 29 and closing the switch 30. As the temperature continues to rise, this operation is repeated until "shut-off" position is reached when the limit switch 58 will be tripped, interrupting the circuit at the contacts 645—646.

For another condition of operation, we may assume the night or low level situation with an outside temperature of about 30° F. At this time all high, or day level thermostats are closed, inasmuch as the required night temperature is much lower than the day level, and the low level thermostat KL is closed. The operation is generally the same as heretofore described for day conditions, and current will flow from the transformer secondary along line 510 through time switch Q, along 515 through the normal contacts of switch P of PP' along 516, through thermostat KL, along 517, 512, relay O and 513 to the other side of the transformer secondary, completing the circuit and energizing the relay O, drawing the contact carrying armature against the magnetized core to interrupt contact 650—652 and closing contact 650—651. This will establish a circuit from a power supply 601 along 610, 611, switch R, line 612, 615, motor 22 and field OP, along 628 through contact 647, 648 of switch 68, along 629, 653, through mercury switch 28 along 654 through contacts 650, 651 of relay O, along 519, through switch Q, along 622 through normal contacts of switch N of NN', along 623, switch R, 624, 625 to the other side of the power supply 600 thereby causing the reducer F to open and increase steam pressure to the system.

As previously described the follow up bar 41 will then operate to position the mercury switches to in turn control the reducer F, and position same at the pressure point considered most economical and satisfactory. Further lowering of the outside temperature will again close the mercury switch 28, advancing or increasing the pressure until ultimately the cam would have advanced to give maximum possible heat obtainable with night control.

Under a night or low level condition with an outside temperature cold and an inside temperature just "satisfied", and all low level thermostats open circuited, current will flow from the power supply 601, along lines 610, 611, switch R, lines 612, 615, through motor 22 and field CL along 616 through switch 58, contacts 645, 646, along 617, 618, contacts 650, 652, line 519 through normal contacts of switch P' of PP', along 520, 655, through switch Q along 622 along normal contacts of switch N of NN', along 623, through line switch R to the power supply 600; this will cause the regulator F to move toward closed or decreased pressure position, and the follow up bar 41, re-positions the mercury switches, but the closing operation continues to "shut off" when the limit switch 58 is tripped, opening first the leading cutout 643—644, thus stopping the air pump, closely followed by opening of contact 645—646, stopping the motor 22 with the regulator F in shut-off position.

There is another condition which should be considered, and that is when it is desired to operate at an economical low level because the premises are to be unoccupied for a considerable period. Under these circumstances, assume high level control, the switch NN' is thrown to its opposite position with thermostat KL calling for low level heat and the outside temperature sufficiently low to have closed the mercury switch 28, through the element 49, 48, 45 and associated mechanisms. Current now flows from the secondary of the transformer along 510, switch Q, 511 through high level contacts of all thermostats, along 514 through contact N' of switch NN', along 657, through normal contacts of P or switch PP' along 516 through low level contacts of thermostats KL along 517, 512, relay O along 513 to the other side of the transformer secondary thus energizing relay O and moving the contact carrying armature against the magnetized core, interrupting contact 650—652 and closing contact 650—651. Current now flows from 601, along 610, 611 through line switch R, along 612, 615, motor 22 and field OP, along 628 through contacts 647—648 of switch 68 along 629, 653 through mercury switch 28, along 654 through contacts 650—651, along 519 through normal contacts P of PP' along 520, 656, through contacts of switch N of NN', along 623 through switch R along 624—625, to power supply 600. When the heat requirement has been satisfied and the low level thermostat KL opens, the operation is as described above for night or low level condition with the inside temperature just gone on "satisfied".

Referring now to the diagram illustrated in Fig. 12, the position of the switches and parts is illustrated when call has been made for more steam. In this diagram a thermostat K in a zone has closed the circuit. As a consequence of this closing, current will now flow through the relay solenoid O, which in turn pulls over the armature bar into contact with the solenoid plunger. This switching operation now permits a flow of current through the feed line, through the armature and one of the fields of the motor 22 on through the limit switch 68, thence through the Mercoid switch 30, through the relay contact and over through the day side contact of the clock operated switch Q, and from there on through the normal contact of the upper side of switch N' and from there through the contact of the main load switch R to the power lines.

The motor is now energized and traverses the weight adjusting bar until either one of two things happens—either the travel of the switch adjusting rod is sufficient to tilt the Mercoid switch bar so that the contacts of switch 30 are opened, or until the closed thermostat K opens due to a sufficient rise in temperature in its zone.

Most generally, the first mentioned contingency happens. The pressure regulating valve G is now set to supply an increased amount of steam to the system and when the temperature has been raised to that determined by the thermostatic adjustment, the thermostat K which has been closed will open.

Fig. 13 is a graphic representation of the switches and controls at the end of the cycle illustrated in Fig. 12. It will be noticed that the thermostatic element contact has been broken or is open, due to the zone being warm enough. As a consequence of this breaking or opening of the supply circuit which includes the winding of the solenoid O, the relay is transferred to the other set of contacts by the action of the spring.

Due to the action occurring in diagram Fig. 12, it will be noticed that the Mercoid switches 28, 29 and 30 have been tilted to a greater angle. This was mentioned in the previous description of the diagram Fig. 12 as the switch 30 becomes open due to the tilting.

At the time switch 30 was opened, the contacts of switch 29 became submerged in the mercury, due to the increased angle thus closing the circuit indicated on this diagram and energizing the other field of the weight bar traversing motor, this time in a direction to adjust the weight bar so that the system can take less steam. This traversing of the weight adjusting bar will continue until the mechanism has reached a position where the contact points of switch 29 will be left clear of the mercury, which, of course, breaks the circuit and the entire mechanism then will remain in this position until some other action is demanded.

It will be noted that this reverse action as distinct from the one described in Fig. 12 causes the contact points of switch 30 to become submerged in the mercury again, but due to the position of the contact points of the solenoid operated relay, it is not possible for this submergence to permit current to flow to energize the operating motor.

It thus will be seen that the parts have now completed a cycle of operation and that the entire control system is back to that shown in Fig. 11 and the control position is now such that the closing of any one of the zone thermostats will permit current to flow through the switch 30 and the "increased heat" field of the motor and go through the cycle as first described and in connection with the diagram shown in Fig. 11.

Figure 16:
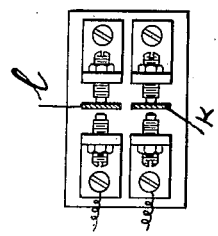
Fig. 16 is a sectional view on the line 16—16 of Fig. 15.
Figure 15:
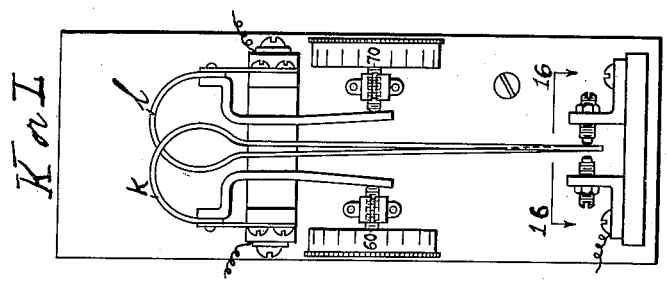
Fig. 15 is a front elevation of the same with the cover taken off.
Figure 14:
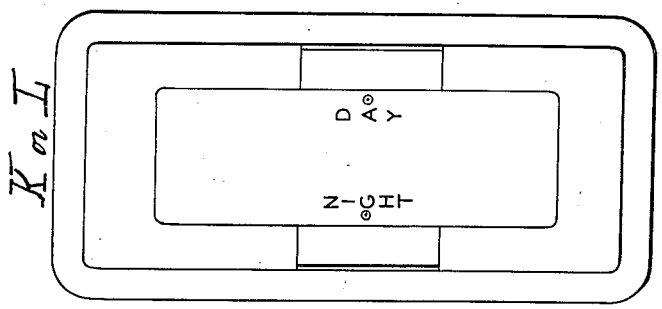
Fig. 14 is a front elevation of one of the dual thermostatic controls.

One of the dual or double thermostats KRL is shown in Figs. 14, 15 and 16. Each thermostat comprises two temperature responsive arms $k$ and $l$ working between contacts, as shown. These elements usually are made out of strips of two different metals. The arm $l$ is adjusted to give the so-called day temperature range, and the arm $k$ to give the so-called night temperature range.

A time clock Q may be put in circuit to automatically throw the day and night thermostatic couples into and out of operation, if desired. R is the main line switch energizing everything but the electric clock which is never disconnected.

Many arrangements of circuits may be employed, the one illustrated diagrammatically in Figs. 11, 12 and 13 being one adapted for the operations described. The switches may be conveniently arranged on a panel board in position to be adjusted by the engineer.

From the foregoing arrangements, it will be seen that in the day time the pressure regulator is adjusted to keep the temperature in the building at a comfortable point, say around 70° to 72° F., and that during the night time the device will be set to work on the night thermostatic sets and a lower temperature, say around 60° F. will be maintained.

These adjustments described are thus for a large office building or shop; for apartment houses, hotels, etc. other settings may be adopted.

Many forms of pumping mechanism can be used for maintaining the requisite steam differential, meaning by that term the difference in pressure between that in the main passing to the radiators, and that in the main returning from the radiators.

The simple form of mechanism shown at E in my prior patent, No. 1,934,504, previously referred to, can be used in smaller buildings, but for larger buildings, I prefer the arrangement shown in Fig. 1.

In this arrangement, the returns from the steam heating system are led to a receiving tank S which has a turbine operated mechanism T secured to the side thereof. This turbine driven apparatus may be substantially the same as shown in patent reissued to me December 8, 1931, No. 18,275. A differential valve U is arranged in the steam main B, and pipes 70 and 71 extend from the steam main from opposite sides of the differential valve U to drive the turbine. The pumping mechanism driven by the turbine may comprise an air and water pump as arranged and connected as shown in my said Reissue Patent No. 18,275, or may comprise simply a vacuum pump. If a water pump is used, the same is connected at a pipe 72 to the boiler A. This pumping apparatus will work when there is enough steam passing to the system to give a differential of say 2½ to 3 pounds to operate the turbine, but reliance is not placed on this mechanism for the complete operation. This turbine, before described, operates economically as no electricity is used and can be arranged to do the major part of the work but as there are many times in the cycle of operation particularly on low pressures when the turbine cannot be relied upon, additional mechanism is provided. An additional water and air pump V is arranged on the other side of the tank S and is driven by a motor W which is controlled by a float switch Y and a vacuum regulator Z. The float switch is so arranged that when the water in the receiving tank rises to a high level, this motor and pump will be thrown into operation. This device is used so that the tank never can become flooded.

The water end of pump V is connected into an extension of the pipe 72 provided with a check valve so that this pump can operate in co-operation with the water pump in the turbine couple if such water pump is used. A pump cutout valve 73 is arranged in the pipe 72 and is electrically connected to the circuit extending from the float switch to the motor W so as to prevent any air being pumped into the boiler, as shown, described and claimed in an application for patent, filed by me October 13, 1933, Serial No. 693,509.

Controller Z throws the pump into and out of operation to maintain a steam differential which will increase as the steam pressure increases and the vacuum increases, according to the method will decrease as the steam pressure decreases and the vacuu mincreases, according to the method described and claimed in patent granted to me March 29, 1932, No. 1,851,434.

The entire heating apparatus thus has been designed to use as little steam as is possible and is particularly adapted to use very little steam on warm days.

While the arrangements and methods herein described have been worked out for use in large buildings to meet all conditions for the economical use of steam therein, it is not necessary to use all of the elements herein described to obtain the economies described, as many desirable results can be obtained by using the combinations in the claims hereto appended.

The details and arrangements herein shown and described may be greatly varied by a skilled mechanic without departing from the scope of the invention as expressed in the claims.

Having thus fully described my invention, what I claim and desire to secure by Letters Patent is:—

1. In a vacuum steam heating apparatus a pressure regulator having an adjustable weight, means for automatically adjusting the position of the weight, a pump for maintaining the vacuum, and a cutout for the pump arranged to be operated by the adjustable weight to cut the pump out of operation when the weight is adjusted to its position for minimum or no supply.

2. In a vacuum steam heating apparatus, a pressure regulator having a thermostatically controlled mechanical element, thermostatic means for automatically adjusting said mechanical element, a pump for maintaining the vacuum, and a cutout for the pump arranged to be operated by the mechanical element to cut the pump out of operation when said element is adjusted to its position for minimum or no supply.

3. In a vacuum steam heating apparatus, a pressure regulator having an adjustable mechanical element, means for automatically adjusting said element, a pump for maintaining the vacuum, and a cutout for the pump arranged to be operated by the adjustable element to cut the pump out of operation when the element is adjusted to a position for minimum or no supply.

IRVING C. JENNINGS.

CERTIFICATE OF CORRECTION.

Patent No. 2,083,068.  June 8, 1937.

IRVING C. JENNINGS.

It is hereby certified that error appears in the printed specification of the above numbered patent requiring correction as follows: Page 3, first column, line 33, for the reference numeral "570" read 57; page 6, second column, line 58, after the word "vacuum" insert decreases, and which differential will decrease as the steam pressure decreases and the vacuum; and lines 59 and 60, strike out "will decrease as the steam pressure decreases and the vacuu mincreases, according to the method"; and that the said Letters Patent should be read with these corrections therein that the same may conform to the record of the case in the Patent Office.

Signed and sealed this 27th day of July, A. D. 1937.

Henry Van Arsdale (Seal) Acting Commissioner of Patents.